United States Patent [19]

Kunita et al.

[11] Patent Number: 4,926,388

[45] Date of Patent: May 15, 1990

[54] ELECTRONIC DEVICE FOR INDEPENDENTLY ERASING SECRET AND NON-SECRET DATA FROM MEMORY

[75] Inventors: Hisao Kunita, Mie; Akitaka Morita, Nara; Eichika Matsuda, Yamatotakada, all of Japan

[73] Assignee: Sharp Kabushiki Kaisha, Osaka, Japan

[21] Appl. No.: 198,247

[22] Filed: May 25, 1988

[30] Foreign Application Priority Data

May 27, 1987 [JP] Japan .................................. 62-130612

[51] Int. Cl.⁵ ............................................. G11C 13/00
[52] U.S. Cl. ...................................... 365/244; 365/52; 365/218; 235/59 R
[58] Field of Search ......................... 365/218, 52, 244; 235/380, 61 R, 59 R

[56] References Cited

U.S. PATENT DOCUMENTS 4,819,204  4/1989  Schrenk .............................. 365/218

OTHER PUBLICATIONS

Stephen B. Weinstein, "Smart Credit Cards: The Answer to Cashless Shopping", IEEE Spectrum, 2/1984, pp. 43-49.

Primary Examiner—Terrell W. Fears

[57] ABSTRACT

In an electronic appliance capable of storing secret data to be kept secret and data other than the secret data in distinction from each other, only the secret data can be erased upon a first reset operation and the data other than the secret data can be erased upon a second reset operation.

9 Claims, 7 Drawing Sheets

Fig. 6a  [RESET] → ▢π RESET OK?

Fig. 6b  [ENTER] → ▢π RESET!

Fig. 6c  NAME?

Fig. 7a  [RESET] → RESET OK?

Fig. 7b  [ENTER] → RESET!

Fig. 7c  NAME?

Fig. 8

| AREA FOR CONTROL DATA | | } A |
|---|---|---|
| HIMITU | | } B |
| 0 | AOKI | 07435-2-1123 |
| 1 | BANK-1 | 21345 |
| 1 | BANK-2 | 69321 |
| 0 | C.JOHN | 06-343-1125 |
| 1 | EMILY | 03-545-9283 |
| 0 | HAYASI | 06-921-7890 |

(bracket C spans the data rows)

Fig. 9

| AREA FOR CONTROL DATA | | } A |
|---|---|---|
| | | } B |
| 0 | AOKI | 07435-2-1123 |
| 0 | C.JOHN | 06-343-1125 |
| 0 | HAYASI | 06-921-7890 |
| | | |
| | | |
| | | |

(bracket C spans the data rows)

ELECTRONIC DEVICE FOR INDEPENDENTLY ERASING SECRET AND NON-SECRET DATA FROM MEMORY

BACKGROUND OF THE INVENTION

1. Field of the Invention

The present invention generally relates to an electronic appliance such as an electronic memory device or the like capable of storing therein secret data which can not be outputted without input of a password, and more particularly, to an electronic appliance capable of erasing not only all data stored therein, but also only the secret data stored therein.

2. Description of the Prior Art

Conventionally, an electronic appliance such as an electronic memory device or the like has a function for storing secret data to be kept secret and other data into a memory.

In the conventional electronic appliance, however, when a reset operation has once been executed to erase the data stored in the memory, all the data stored in the memory are entirely erased through a single operation.

Because of this, in the case where an operator has forgotten a password required for outputting the secret data, not only the secret data but any other data are simultaneously erased by the execution of a single reset operation. This is disadvantageous in that the operator is inevitably requested to input again the data other than the secret data.

SUMMARY OF THE INVENTION

Accordingly, the present invention has been developed with a view to substantially eliminate the above described disadvantage inherent in the prior art electronic appliance, and has for its essential object to provide an improved electronic appliance which is capable of selectively erasing all data or only data to be kept secret.

In accomplishing this and other objects, according to one preferred embodiment of the present invention, there is provided an electronic appliance capable of storing therein the secret data to be kept secret and data other than the secret data in distinction from each other, which has means for erasing only the secret data upon a first reset operation and for erasing the data other than the secret data upon a second reset operation.

By the above described construction of the present invention, when an operator has forgotten a password required to call the secret data, he can erase only the secret data so that any other person is prevented from viewing the secret data or memory for storing therein the data can not be used by an unauthorized person. The data other than the secret data can, therefore, be stored or left as it is when the secret data is erased. Accordingly, the electronic appliance of the present invention is advantageous in that the operator is free from time-consuming work of repeating the input of data other than the secret data.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and in which.

DETAILED DESCRIPTION OF THE PREFERRED EMBODIMENT

Figure 1:
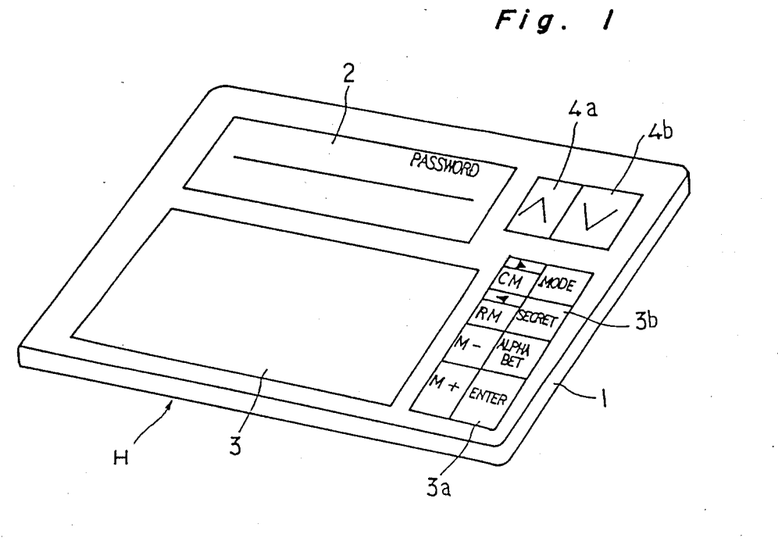
FIG. 1 is a perspective view of an electronic appliance on its front side according to one preferred embodiment of the present invention.

FIG. 1 depicts an electronic pocket calculator H according to one preferred embodiment of the present invention.

The electronic pocket calculator H is provided on its body 1 with a two-stage display type liquid crystal display unit 2 for displaying inputted data or the like, a keyboard (key unit) 3 having a plurality of alphanumeric keys for inputting numerals and letters and various other keys such as an ENTER key 3a, a SECRET key 3b, two SEARCH keys 4a and 4b etc.

The calculator body 1 accommodates a memory (not shown) for storing therein data inputted by the operation of the keyboard 3 and has a function for storing the inputted data as secret data into the memory.

More specifically, when the data inputted by the keyboard 3 is required to be stored into the memory, the ENTER key 3a is operated. If an operator wants to store the data inputted by the operation of the ENTER key 3a as the secret data, the SECRET key 3b is operated.

The inputted data is stored in the memory distinctly as either the secret data or the data other than the secret data in accordance with whether or not the SECRET key 3b has been operated.

The operator can call the data stored in the memory by the operation of the SEARCH key 4a or 4b. The data stored in the memory is called, in response to the operation of the SEARCH key 4a or 4b, either in an order of respective addresses or opposite thereto.

However, when only the SEARCH key 4a or 4b has been depressed, only the data other than the secret data is called and displayed in the display unit 2.

The operator can call the secret data by inputting a certain password and then depressing the SEARCH key 4a or 4b. In this case, the secret data is called at first, and subsequently, the data other than the secret data is called.

Figure 2:
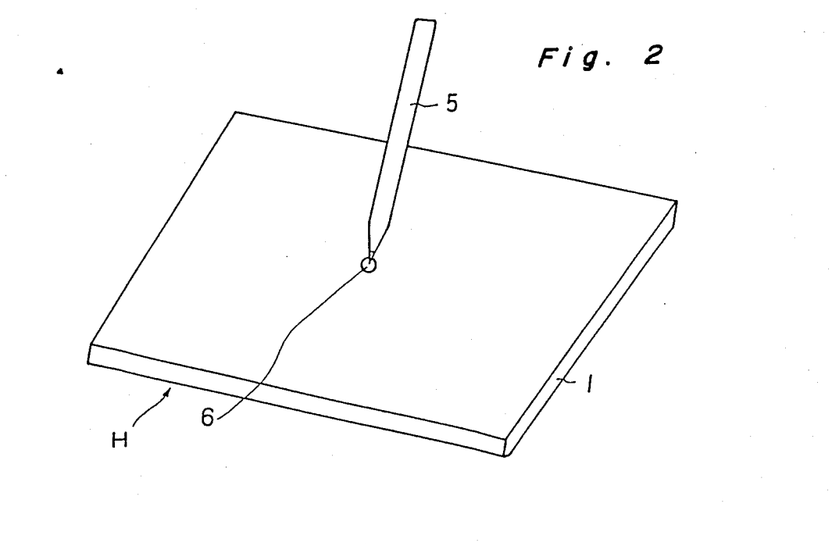
FIG. 2 is a perspective view of the electronic appliance of FIG. 1 on its rear side.

FIG. 2 depicts the rear side of the electronic pocket calculator H of the present invention. As shown in FIG. 2, a relatively small opening accommodating a reset switch 6 is formed in the rear surface of the calculator body 1. A reset operation can be executed upon depression of the reset switch 6 by inserting the tip of a pen 5 or the like into the opening.

The reset operation is executed to erase the data stored in the memory. In this embodiment, however, the electronic pocket calculator H is constructed so that all the data can be erased by a single reset operation.

More specifically, the first reset operation can erase only the entire secret data and the second reset operation can erase all the remaining data other than the secret data.

Accordingly, a single reset operation can erase only the secret data but not the data other than the secret data. It is, therefore, not necessary to input other than the secret data again, since the data other than the secret data is still stored in the memory even after a single reset operation.

It is to be noted here that the single reset operation can erase all the data when data is stored in the memory.

Figure 3:
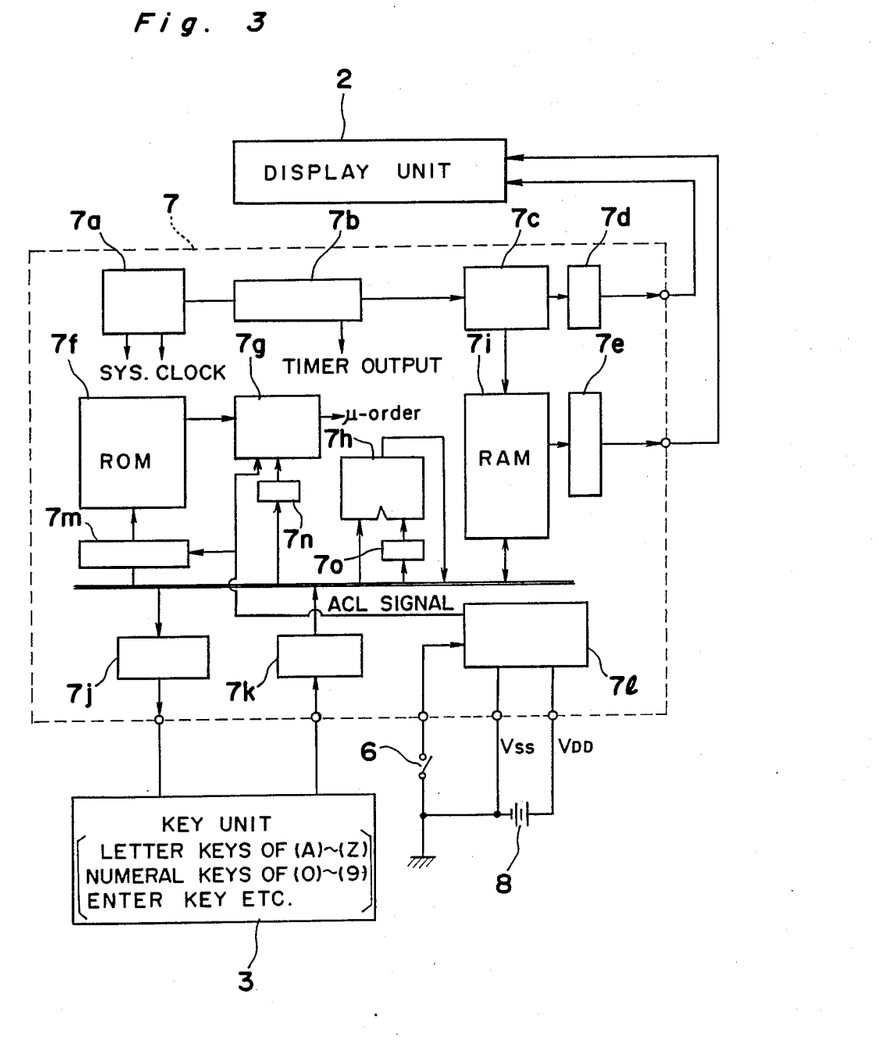
FIG. 3 is a circuit diagram for the electronic appliance of FIG. 1.

As shown in a circuit diagram of FIG. 3, the display unit 2, the keyboard 3 and the reset key 6 are electrically coupled with an LSI chip 7 accommodated in the calculator body 1. The LSI chip 7 is provided with the following circuits:

a clock generating circuit 7a for generating a system clock required to control the entire system;

a dividing circuit 7b for obtaining a timer output and a signal required for liquid crystal display;

a display control circuit 7c for controlling the display unit 2;

a common buffer 7d and a segment buffer 7e for temporarily storing therein a signal which drives a segment used in the display unit 2;

a ROM 7f in which data, under normal conditions, can only be read to control the entire system;

an instruction decoder 7g for outputting a μ-order;

a logic operation unit 7h for executing the logic operation;

a RAM 7i for storing therein all of data for operation use, including storage use and display use;

a strobe signal generating circuit 7j for generating a strobe signal by connecting the LSI chip 7 with the external keyboard 3;

a key input circuit 7k for receiving a key input signal by connecting the LSI chip 7 with the external keyboard 3;

a power control circuit 7l for controlling a power source of the entire system, this circuit 7l including a control portion for executing the predetermined reset operation by outputting an ACL signal when the reset switch 6 has been depressed which is turned on in response to the reset operation or at the time of exchange of a power battery 8;

a program counter 7m which is a counter circuit for addressing the ROM 7f;

a flag 7n for inputting the result of a judge order into the instruction decoder 7g; and an accumulator 7o provided with a register for operation use and the like.

Figure 4:
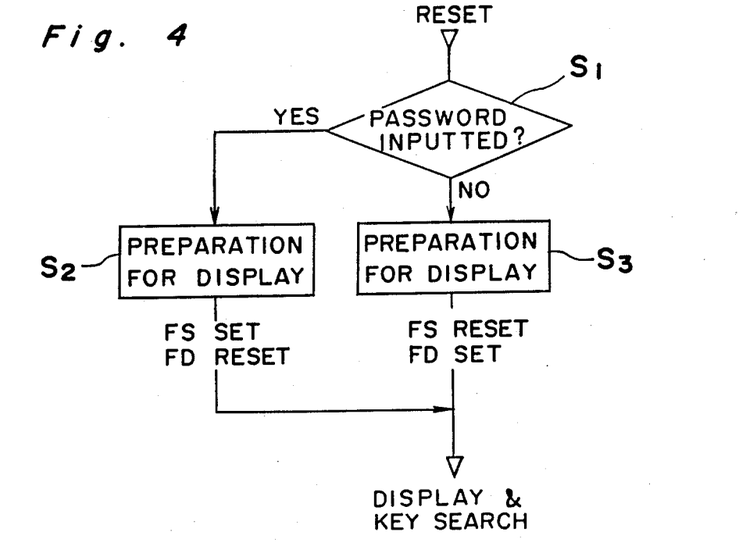
FIGS. 4 and 5 are flow-charts each showing the process to be executed in the electronic appliance of FIG. 1.
Figure 5:
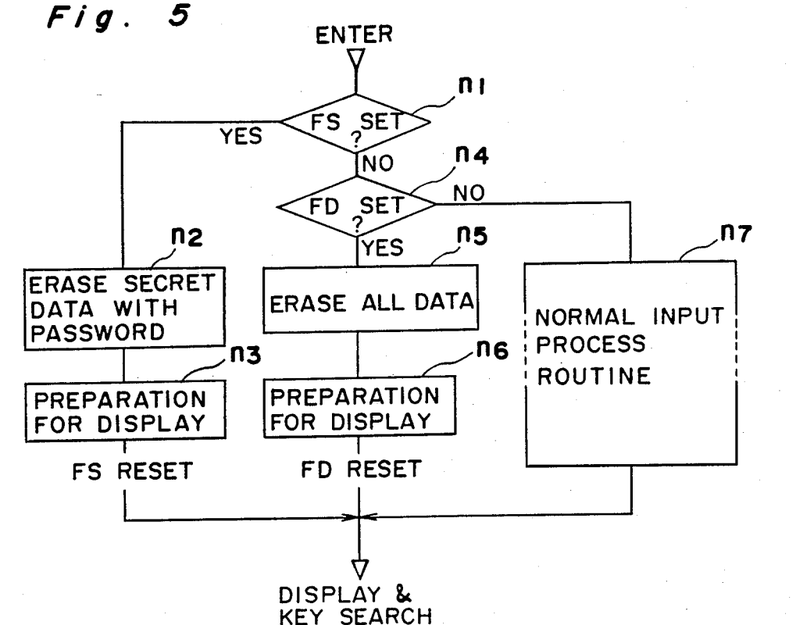

FIGS. 4 and 5 depict flow-charts each showing the process to be executed in this embodiment whereas FIGS. 6a to 6c and FIGS. 7a to 7c depict display conditions of the display unit 2 at the time of respective processes.

When the reset switch 6 has initially been operated, it is judged at step s1 whether or not a password has been inputted. The presence or absence of the input of password is executed with the use of a flag PW which is set when the password is inputted and is reset when no password is inputted. The flag PW is provided in the RAM 7i.

Figure 6A:
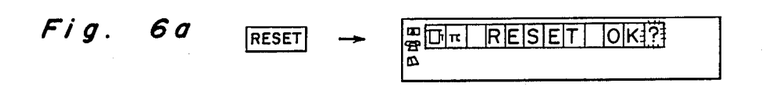
FIGS. 6a to 6c and FIGS. 7a to 7c are views each showing various displays in a display unit provided in the electronic appliance of FIG. 1.

When it is judged at step s1 that the password has been inputted to set the flag PW, the preparation for display as shown in FIG. 6a is executed at step s2, and simultaneously, flags FS and FD provided in the RAM 7i are set and reset, respectively. The flag FS indicates whether or not the password has been inputted. This flag FS is, therefore, set when the password has been inputted and is reset when no password has been inputted. The flag FD indicates whether or not the reset switch 6 has been operated prior to the operation of the ENTER key 3a. This flag FD is, therefore, set when the reset switch 6 has been operated and is reset when the reset switch 6 has not been operated.

These two flags FS and FD discriminate between the case in which only the secret data is erased and the case in which all the data is erased.

Figure 7A:
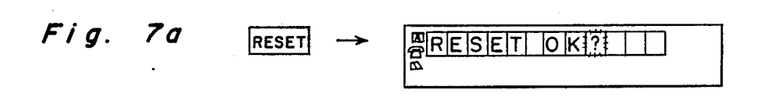

On the other hand, when it is judged at step s1 that no password has been inputted (the flag PW is in the reset condition), the preparation for display as shown in FIG. 7a is executed at step s3, and simultaneously, the flags FS and FD are reset and set, respectively.

After completion of the above described process, each display is executed and awaits the next key operation.

Upon operation of the ENTER key 3a, the flow-chart of FIG. 5 is initiated.

Figure 6B:
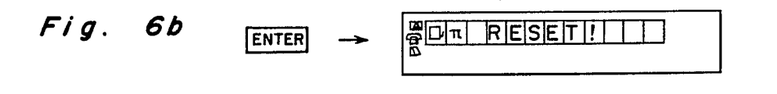
Figure 6C:
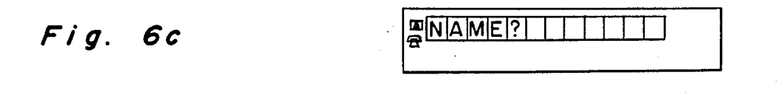

In this flow-chart, it is judged at step n1 whether or not the flag FS has been set. In the case where it is judged at step n1 that the flag FS has been set, the procedure advances to step n2 at which the secret data with the password are erased, followed by step n3 at which the preparation for the displays shown in FIGS. 6b and 6c is executed and the flag FS is reset.

In the case where it is judged at step n1 that the flag FS has been reset, the procedure advances to step n4 at which it is judged whether or not the flag FD has been set.

Figure 7B:
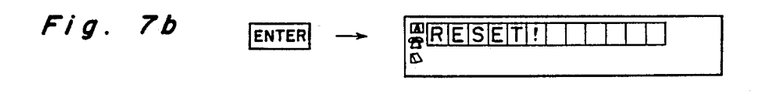
Figure 7C:
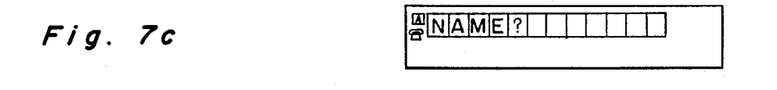

When it is judged at step n4 that the flag FD has been set, all the data are erased at step n5 followed by step n6 at which the preparation for the displays as shown in FIGS. 7b and 7c is executed and the flag FD is reset.

In contrast, when it is judged at step n4 that the flag FD has been reset, the procedure advances to step n7 at which the normal input process routine is executed.

After completion of the aforementioned process, the predetermined display is executed upon completion of the preparation therefor and awaits the next key operation.

FIGS. 6a to 6c each illustrate the display in the case where the password has been created. As shown in FIG. 6a, upon operation of the reset switch 6, a message "RESET OK?" is displayed in the display unit 2 to ask the operator whether or not the secret data including the password may be erased or reset. The display shown in FIG. 6b is executed in response to the operation of the ENTER key 3a, and approximately one second later, the display shown in FIG. 6c is executed to inform the operator that the secret data including the password have been erased. The procedure then returns to a mode to be set when the reset switch 6 has just been depressed.

On the contrary, FIGS. 7a to 7c each illustrate the display in the case where no password has been created. As shown in FIG. 7a, upon operation of the reset switch 6, the message "RESET OK?" is displayed in the display unit 2 to ask the operator whether or not the data other than the secret data may be erased or reset. The display shown in FIG. 7b is executed in response to the operation of the ENTER key 3a, and approximately one second later, the display shown in FIG. 7c is executed to inform the operator that the data other than the secret data has been erased. The procedure then returns to the mode to be set when the reset switch 6 has just been depressed.

Figure 8:
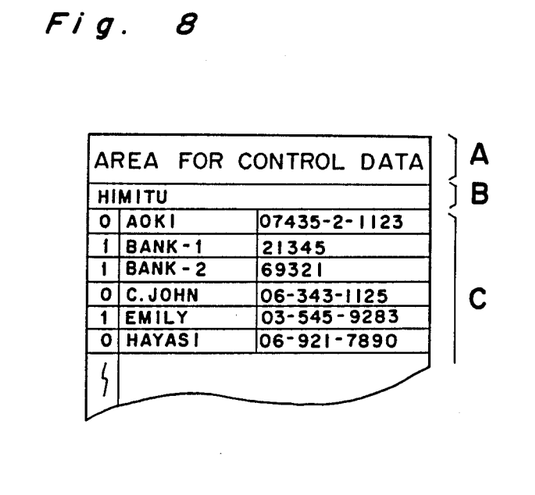
FIGS. 8 and 9 are views explanatory of the change in memory content with data erasure.
Figure 9:
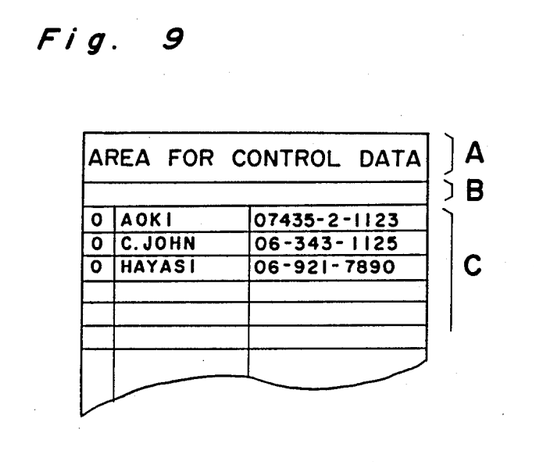

FIGS. 8 and 9 are each an illustration explanatory of the change in memory content with data erasure.

In FIGS. 8 and 9, a reference letter A represents an area for control data for storing therein the number of registered data, the remaining capacity in the memory and the like. A reference letter B represents an area for the password. A reference letter C represents an area for registered data. In the area C, a numeral "1" in the first column indicates that the registered data is the secret data to be kept secret whereas a numeral "0" in the first column indicates that the registered data are the data other than the secret data. For example, a personal identification number of a cash card used in a bank is considered as the secret data.

Under the storage condition shown in FIG. 8, when the secret data including the password is erased upon the reset operation, the memory content changes into the storage condition as shown in FIG. 9.

When a predetermined password ("HIMITU" in this embodiment) has been inputted and the SEARCH key 4a or 4b has been depressed under the storage condition of FIG. 8, the secret data is called in an order of respective addresses in accordance with the number of times of the operation. In the case of FIG. 8, the data such as "BANK-1 21345", "BANK-2 69321" and the like are called in this order. The data other than the secret data are then called in order of respective addresses, for example, in order of "AOKI 07435-2-1123", "C. JOHN 06-345-1125" and the like in this embodiment. Each of the data is in turn displayed in the display unit 2.

In contrast, in the case where the predetermined password has not been inputted, only the data other than the secret data is called in order of respective addresses in accordance with the number of times the SEARCH key 4a or 4b is operated. Each of the data is in turn displayed in the display unit 2.

Figure 10:
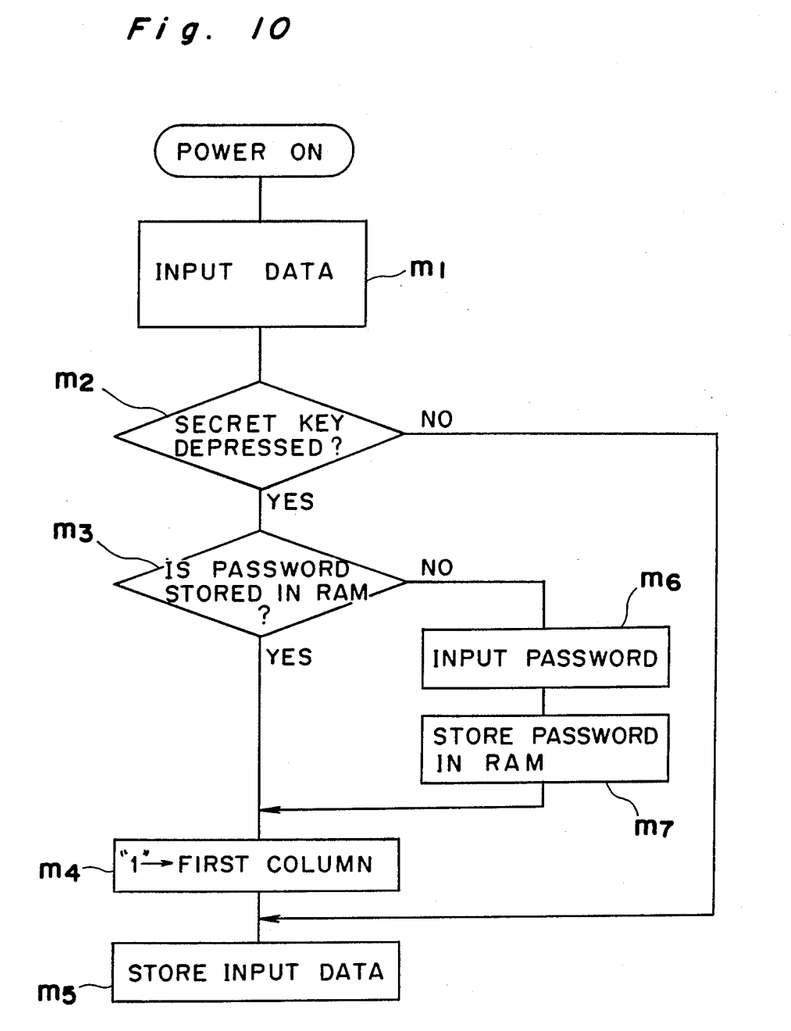
FIG. 10 is a flow-chart showing the process for data input.

FIG. 10 shows an input process of the secret data and the password.

When an operator inputs data at step m1 after the power source has been turned on, it is judged at step m2 whether or not the SECRET key 3b has been depressed. When the SECRET key 3b has been depressed, it is judged at step m3 whether or not the password is stored in the RAM 7i.

If it is judged at step m3 that the password is stored in the RAM 7i, "1" is stored at step m4 in the first column of a data storage region in the registered data area C. It is to be noted that all of the first columns of the data storage regions in the registered data area C are initially set to "0" in advance.

Inputted data is then stored at step m5.

If the SECRET key 3b has not been depressed at step m2, the procedure directly advances to step m5.

If the password is not stored in the RAM 7i at step m3, a word "PASSWORD" is displayed in the display unit as shown in FIG. 1 to enable the operator to input the password at step m6.

Upon input of the password, the inputted password is stored in the RAM 7i at step m7 followed by step m4.

Figure 11:
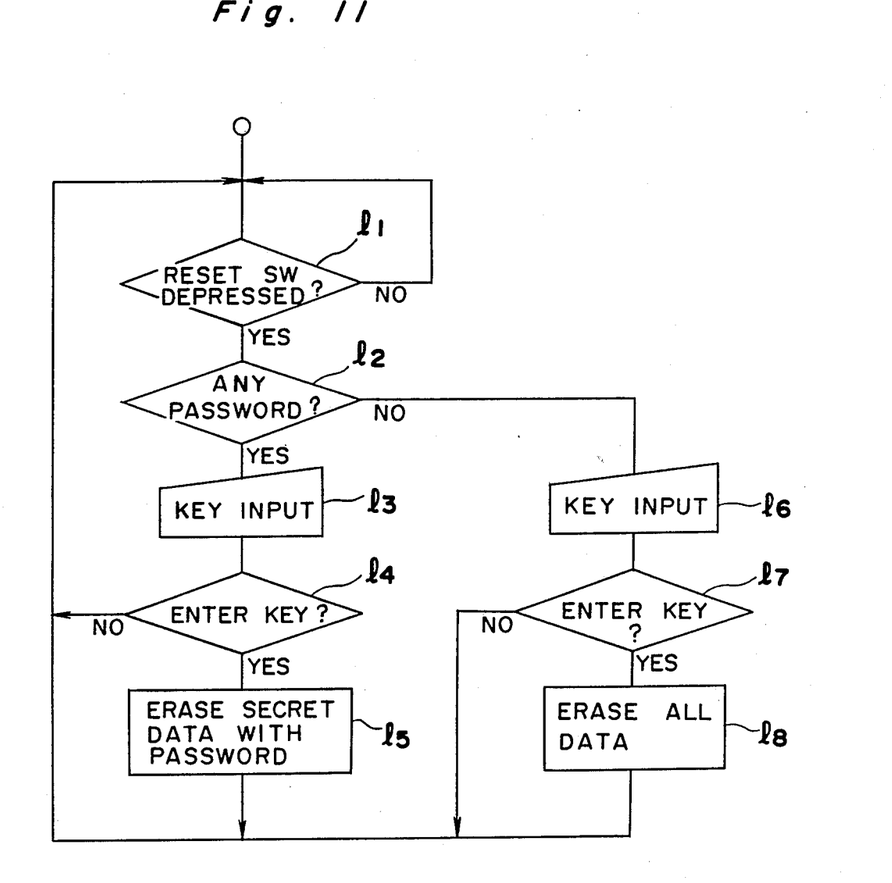
FIG. 11 is a flow-chart showing the process to be executed in another embodiment of the present invention.

Different from the above described embodiment, the secret data or the data other than the secret data may be erased through program processing according to another embodiment of the present invention, as shown in a flow-chart of FIG. 11. In the flow-chart of FIG. 11, it is judged at step 11 whether or not the reset switch 6 has been depressed. Upon depression of the reset switch 6, the procedure advances to step 12 at which the presence or absence of the password is judged.

In the case where the password exists, it is judged at step 14 whether or not a certain key depressed at step 13 is the ENTER key 3a. When the judgment at step 14 is YES, all the data having "1" in respective first columns is erased at step 15 together with the password.

On the other hand, in the case where no password exists at step 12, it is judged at step 17 whether or not a key depressed at step 16 is the ENTER key 3a. If the ENTER key 3a has been depressed, all the data are erased at step 18.

In the electronic appliance according to the present invention, when the data including the secret data is stored therein, only the secret data can be erased upon the first reset operation and all of the remaining data other than the secret data can be erased upon the subsequent second reset operation. Furthermore, when no secret data are stored, all the data can be entirely erased upon a single reset operation.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An electronic memory device comprising:
   means for inputting alphanumeric and code data;
   memory means for storing said input data;
   means for storing said input data in said memory means as secret data, non-secret data, and secret code data;
   means for recalling only said secret data from said memory means;
   means for recalling only said non-secret data from said memory means;
   means, responsive to said means for recalling, for displaying said secret and non-secret data;
   means for resetting said device to clear only said secret data and said secret code data from said memory means; and
   means for resetting said device to clear all remaining data in said memory means subsequent to clearing only said secret data and said secret code data, wherein said secret data and said secret code data is selectively input, stored, recalled and cleared by an operator, thereby controlling access to said secret data by an unauthorized operator of said electronic memory device.

2. The electronic memory device according to claim 1, wherein said means for inputting alphanumeric data is a keyboard including numerical and lettered keys and said means for inputting code data include a plurality of predefined function keys on a keyboard of said electronic memory device.

3. The electronic memory device according to claim 1, wherein said memory means includes a first memory area for storing said secret data and said secret code data and a second memory area for storing said non-secret data.

4. The electronic memory device according to claim 1, wherein said means for storing said input data as either secret or non-secret data includes actuation of a predetermined sequence of alphanumeric and function keys for specifying storage in secret and non-secret memory areas.

5. The electronic memory device according to claim 1, wherein said means for recalling only said secret data from said memory means includes input of said secret code data followed by bi-directional searching of the memory contents.

6. The electronic memory device according to claim 1, wherein said means for recalling only said non-secret data from said memory means includes bi-directional searching of the memory contents.

7. The electronic memory device according to claim 1, wherein said means for displaying is a two-stage liquid crystal display unit.

8. The electronic memory device according to claim 1, wherein said means for resetting said device to clear only said secret data and said secret code data includes a single actuation of a reset switch.

9. The electronic memory device according to claim 1, wherein said means for resetting said device to clear all remaining data includes a dual actuation of a reset switch.

* * * * *